C. M. JOHNSON.
WAVE MOTOR.
APPLICATION FILED DEC. 7, 1918.
1,314,401.
Patented Aug. 26, 1919.
3 SHEETS—SHEET 1.
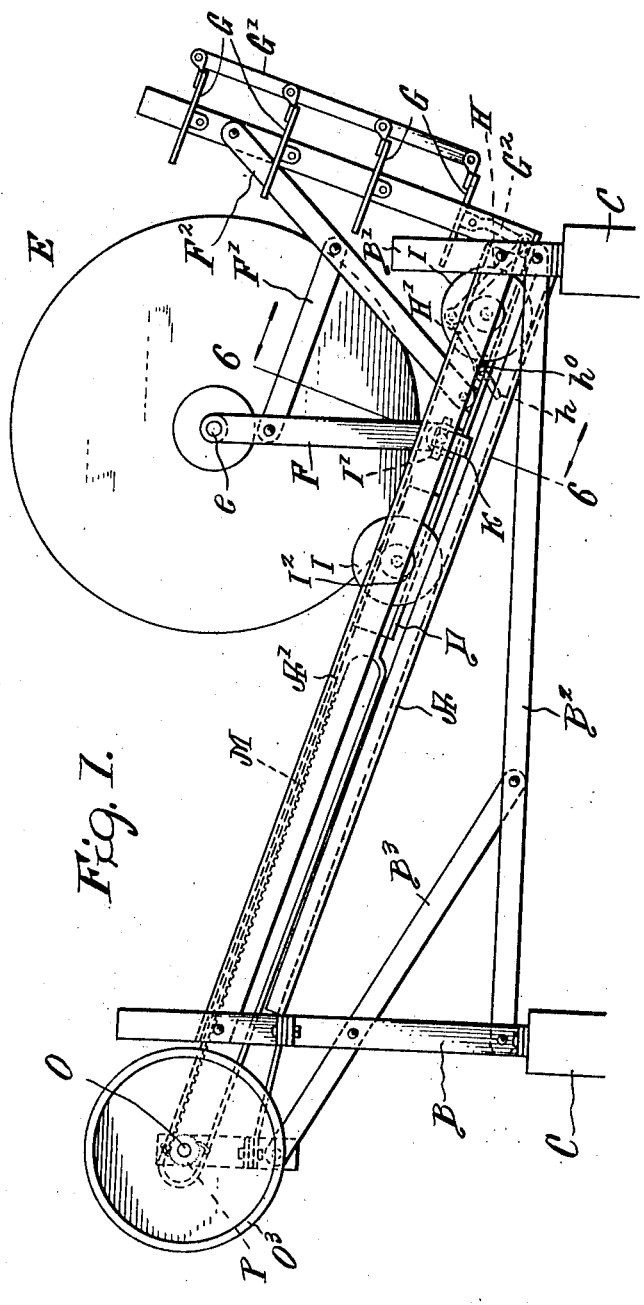
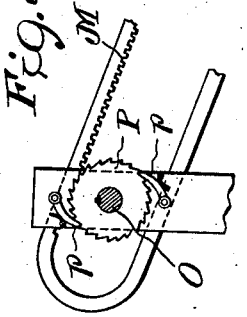
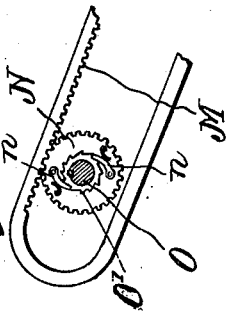
Inventor
Claude M. Johnson
by Wilkinson + Giusta,
Attorneys.

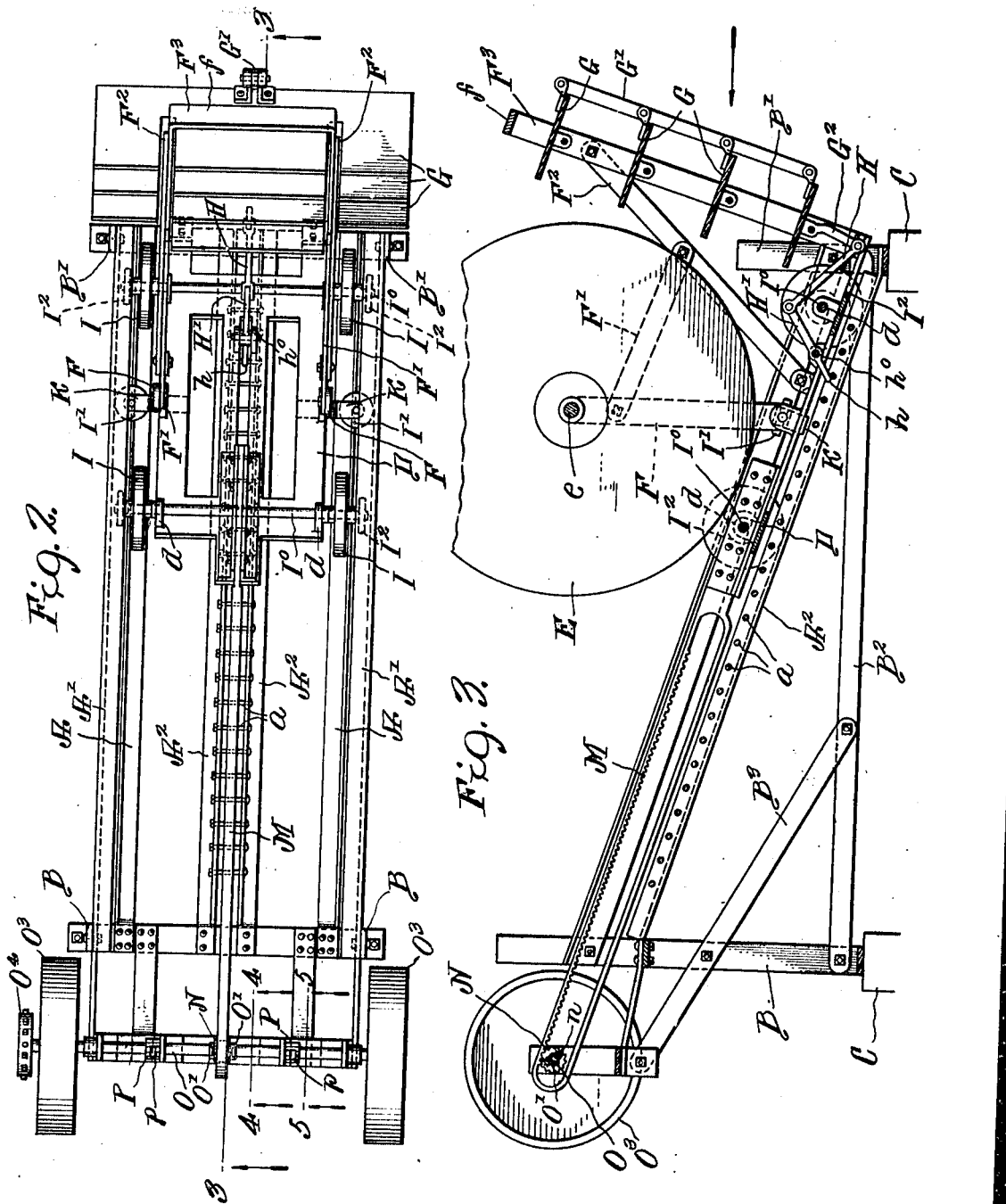

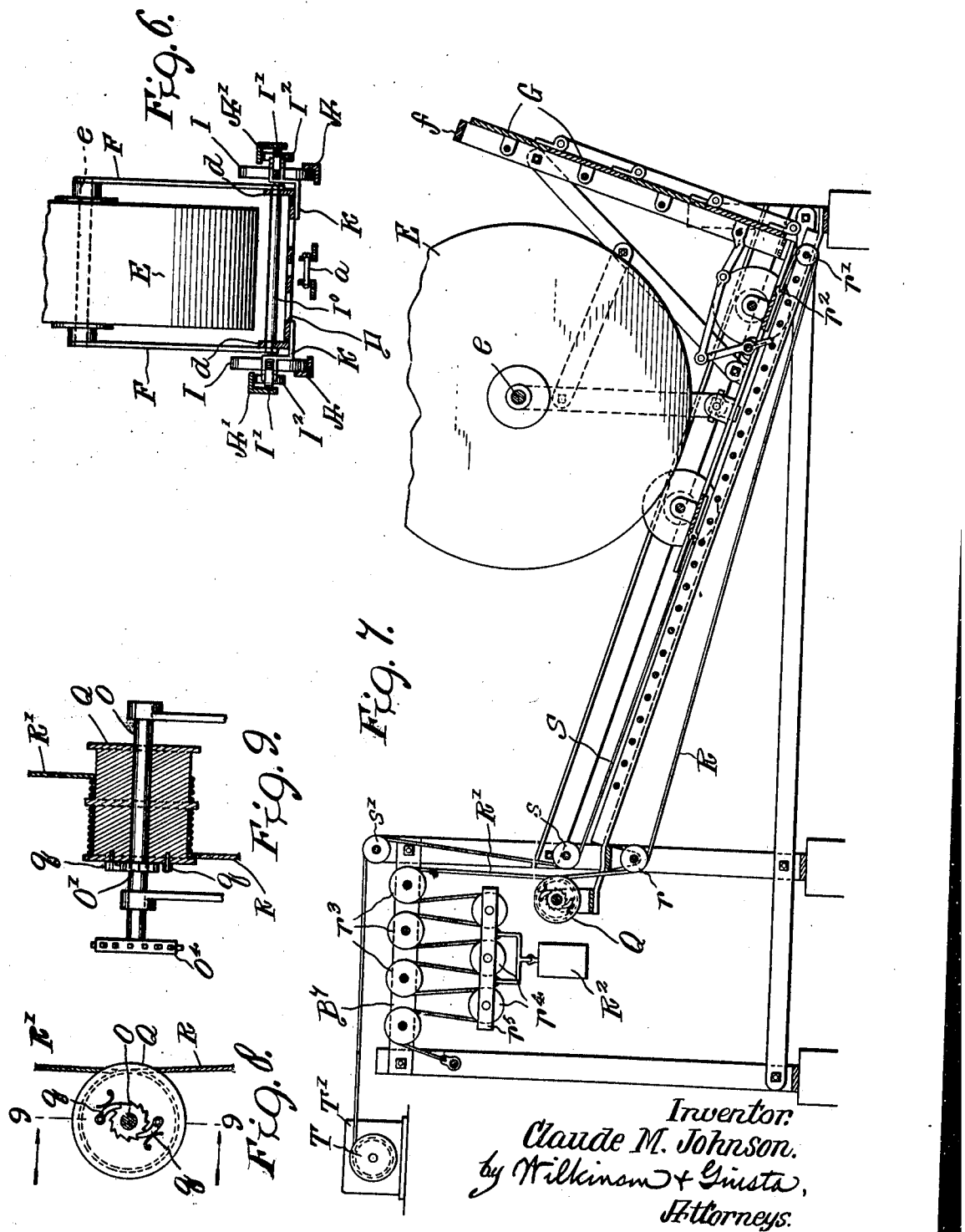

UNITED STATES PATENT OFFICE.

CLAUDE M. JOHNSON, OF NEW YORK, N. Y.

WAVE-MOTOR.

1,314,401. Specification of Letters Patent. Patented Aug. 26, 1919.

Application filed December 7, 1918. Serial No. 265,812.

*To all whom it may concern:*

Be it known that I, CLAUDE M. JOHNSON, a citizen of the United States, residing at New York city and State of New York, have invented certain new and useful Improvements in Wave-Motors; and I do hereby declare the following to be a full, clear, and exact description of the invention, such as will enable others skilled in the art to which it appertains to make and use the same.

My invention relates to improvements in wave motors, and is intended to provide an apparatus which will convert the kinetic energy of the waves into useful power.

My invention is intended to be operated at various stages of the tide, and also at various conditions of the surf, and in case the surf becomes so high as to be liable to injure the apparatus I provide means for removing the operative parts from the violence of the waves.

My invention will be more clearly understood after reference to the accompanying drawings, in which like parts are indicated by similar reference symbols throughout the several views, and in which:—

Figure 1 is a diagrammatic representation of the apparatus in side elevation, showing the shutters in the open position.

Fig. 2 is a plan view of the device shown in Fig. 1, and with the float removed.

Fig. 3 shows a section along the line 3—3 of Fig. 2, and looking in the direction of the arrows, and shows the shutters in the open position.

Fig. 4 shows a section along the line 4—4 of Fig. 2, and looking in the direction of the arrows, the parts being shown on a larger scale.

Fig. 5 shows a section along the line 5—5 of Fig. 2, and looking in the direction of the arrows, the parts being shown on a larger scale.

Fig. 6 shows a section along the line 6—6 of Fig. 1 and looking in the direction of the arrows.

Fig. 7 shows a modification in a section similar to that shown in Fig. 3, but with the shutters closed. In this modification the power shaft is operated by a drum and cables.

Fig. 8 is an enlarged view of the power shaft and drum, with a ratchet and pawl arrangement for connecting the drum to the power shaft; and Fig. 9 shows a section along the line 9—9 of Fig. 8, the parts being shown in elevation.

The apparatus comprises primarily an inclined track on which a sliding carriage is driven by the waves, and this carriage drives the power shaft from which power is transmitted in any convenient way.

The track comprises two angle bars A on which the main wheels of the carriage travel, and two parallel angle bars A' against which the guide wheels of the carriage engage, to be hereinafter described.

Between the angle bars A are a pair of angle bars $A^2$, separated from each other as shown in Fig. 6, but connected together by the pins $a$ to form a pin rack. These angle bars A, A' and $A^2$ are connected to the standards B and B', forming part of the main framework of the apparatus. These standards may be connected together or braced in any convenient way, as by braces $B^2$ and $B^3$, and the whole frame rests upon a suitable foundation C of concrete, piling, or other suitable material. The frame projects out from the shore, and the incline may be of any desired length.

D represents the carriage which travels upon the track, and is provided with upwardly projecting bearings $d$ for the shafts $I^0$ and the wheels I which run on the inclined tracks A. These shafts also carry similar guide wheels $I^2$ adapted to engage beneath the angle irons or guide rails A', and the carriage is also provided with brackets K having horizontally disposed wheels I' which will engage inside of the guide rails A', as shown in Fig. 6.

By this arrangement the weight of the carriage rests on the main wheels I traveling in the tracks A, and the carriage is prevented from tilting upward by means of the guide wheels $I^2$, and is prevented from surging laterally by means of the guide wheels I'.

Supported on the carriage in any convenient way is the hollow drum E, which is mounted on the shaft $e$ journaled in any suitable frame carried by the carriage, such as the bars F and F'. The bars F' are connected to the inclined braces F², and these braces are secured at their lower ends to the carriage E, and at their upper ends to the shutter frame F³.

This shutter frame F³ may be conveniently made in the form of an inverted U-shaped bar having its lower ends fast to the carriage and its upper ends connected by the cross piece $f$, which cross piece may be integral with the side bars F³, or rigidly attached thereto, as preferred.

Pivoted between these side bars F³ are a series of shutters G, which are hinged to and connected together by the rod G', so that all the shutters may be moved simultaneously for either the purpose of closing or opening the same, as will be hereinafter described.

The lower shutter is provided with a downwardly projecting arm G² connected by the link H to the lever H', which is pivoted to the carriage as at $h°$, and has its free arm $h$ projecting into the space between the pins $a$ of the pin rack A². The free arm of this lever is resilient, and is of such length as to make contact at one side of the pins $a$ when the shutters are in the closed position as shown in Fig. 7, and at the other side of said pins $a$ when the shutters are in the open position as shown in Figs. 1 and 3. The resiliency of the arm will permit the carriage to move either up or down, and as the carriage moves upward this arm will hold the shutters closed, while as the carriage moves downward this arm will hold the shutters open, as will be hereinafter more fully described.

In the construction shown in Figs. 1 to 5, M represents a rack fast to the carriage D and engaging the pinion N, loosely mounted on the power shaft O which has fast thereon a ratchet wheel O', which is connected by means of the pawl $n$ to the pinion N.

The power shaft O preferably carries one or more fly wheels O³, and power is transmitted from said shaft in any convenient way, as by means of the sprocket wheel O⁴, see Figs. 2 and 9.

Additional means for holding the power shaft against rotation backward may be provided, such, for instance, as the ratchet wheels P fast on said shaft, and the pawls $p$ pivoted to the main frame.

The operation of the device as shown in Figs. 1 to 6 is as follows:

The parts being in the position shown in Fig. 3, the waves coming in the direction of the arrow in said figure will cause the float E to move the carriage to the left. In the early movement of the carriage the arm $h$ will close the shutters, or bring them to the position shown in Fig. 7, when the waves will dash against the closed shutters and the kinetic force of the waves will drive the carriage upward on the inclined track, causing the rack M to rotate the power shaft and store up energy in the fly wheels O³, and also transmit part of said energy through the sprocket wheel O⁴ to the desired point of application of power not shown.

After the carriage has moved upward, the waves will pass beneath the same and the weight of the carriage, and the parts carried thereby, will cause the carriage to slide downward again on the track. As the carriage starts downward, the arm $h$ will reverse the position of the shutters, throwing the same to the open position as shown in Fig. 3, and the carriage and float will descend freely, ready for another stroke.

While I have shown the track as comparatively short, it will be obvious in practice that any desired length of track may be used, so that if desired a long stroke may be secured.

In the modification shown in Figs. 7 to 9, instead of actuating the power shaft by means of a rack, as shown in the former figures, I actuate same by means of a pair of cables wound around a drum. Thus, in Figs. 7 to 9 I have shown a drum Q, loose on the power shaft O. This power shaft carries, as before, a ratchet wheel O' which is adapted to engage the pawls $q$ carried by the drum Q. Wound on this drum are the two separate cables R and R'.

The cable R passes over the pulleys $r$ and $r'$ and is secured to the carriage as at $r^2$. The other cable R' also wound on the drum Q, passes over the pulleys $r^3$ mounted on the framework B⁷, and over the pulleys $r^4$ carried in the movable frame $r^5$, from which movable frame a weight R² is suspended.

With this construction, as the carriage moves upward under the action of the waves as already described, it will haul on the cable R and turn the drum Q and with it will turn the power shaft O. As the carriage descends downward again, the slack of the cable R will be taken up by the weight R². The parts will be restored to the initial position at each oscillation of the carriage.

It will be noted that with the arrangement shown, each of the cables R and R' will always be taut relative to the drum Q. With either form of device it may be desirable to pull the carriage, and the parts carried thereby, clear of the force of the waves, as in a storm, and for this purpose I may provide a suitable hoisting line, such as S, shown in Fig. 7, which is secured to the carriage and passes under the pulley $s$ and over the pulley $s'$, and leads to the drum T driven by the electric motor T' shown diagrammatically in Fig. 7.

By winding up on this drum T the carriage, and the parts carried thereby, may be moved up to the upper end of the track and out of the way of the waves.

Any other suitable hoisting device may be applied to the structure shown in either of the figures.

It will be seen that the shutters when closed will present a solid wall to the waves, and thus will serve like a surf-board to transmit the striking force or kinetic energy of the waves to the carriage, and thence to the power shaft; while the shutters when open will permit the receding water to pass through freely, and will permit the carriage to descend by its own weight, and also will permit it to cut through the crests of the intermediate smaller waves as it descends to the lower position before taking a fresh start upward on another stroke.

It will be obvious that various modifications might be made in the herein described construction, and in the combination and arrangement of parts which could be used without departing from the spirit of my invention, and I do not mean to limit the invention to such details except as particularly pointed out in the claims.

Having thus described my invention, what I claim and desire to secure by Letters Patent of the United States is:—

1. A wave motor apparatus comprising an inclined track, a carriage mounted to reciprocate on said track, a float carried by said carriage, a shutter frame and shutters carried by said carriage and mounted transversely thereon, and means for automatically closing said shutters as said carriage moves upward, a power shaft, and means controlled by the movement of said carriage to rotate said power shaft, substantially as described.

2. A wave motor apparatus comprising an inclined track, a carriage mounted to reciprocate on said track, a cylindrical float journaled in bearings carried by said carriage, and having its axis at right angles to the direction of movement of said carriage, a shutter frame and shutters carried by said carriage and mounted transversely thereon, and means for automatically closing said shutters as said carriage moves upward, a power shaft, and means controlled by the movement of said carriage to rotate said power shaft, substantially as described.

3. A wave motor apparatus comprising an inclined track, a carriage mounted to reciprocate on said track, a float carried by said carriage, a power shaft, and means controlled by the movement of said carriage to rotate said power shaft, a shutter frame and shutters carried by said carriage and mounted transversely thereon, and means for automatically closing said shutters as said carriage moves upward, with means for independently hauling said carriage out of engagement with the waves, when desired, substantially as described.

4. A wave motor apparatus comprising an inclined track, a carriage mounted to reciprocate on said track, a cylindrical float journaled in bearings carried by said carriage, and having its axis at right angles to the direction of movement of said carriage, a shutter frame and shutters carried by said carriage and mounted transversely thereon, and means for automatically closing said shutters as said carriage moves upward, a power shaft, and means controlled by the movement of said carriage to rotate said power shaft, with means for independently hauling said carriage out of engagement with the waves, when desired, substantially as described.

5. A wave motor apparatus comprising an inclined track, a carriage mounted to reciprocate on said track, a float carried by said carriage, a shutter frame and shutters carried by said carriage and mounted transversely thereon, and means for automatically closing said shutters as said carriage moves upward, and for opening said shutters as said carriage descends, comprising a pin rack mounted beneath the carriage, an operating rod connecting the several shutters, a crank arm connected to one of said shutters, a lever pivoted to said carriage and having an arm projecting into engagement with said pin rack, with a link connecting said crank arm and said lever, a power shaft and means controlled by the movement of said carriage to rotate said power shaft, substantially as described.

6. A wave motor apparatus comprising an inclined track, a carriage mounted to reciprocate on said track, a cylindrical float journaled in bearings carried by said carriage, and having its axis at right angles to the direction of movement of said carriage, a shutter frame and shutters carried by said carriage and mounted transversely thereon, and means for automatically closing said shutters as said carriage moves upward, and for opening said shutters as said carriage descends, comprising a pin rack mounted beneath the carriage, an operating rod connecting the several shutters, a crank arm connected to one of said shutters, a lever pivoted to said carriage and having an arm projecting into engagement with said pin rack, with a link connecting said crank arm and said lever, a power shaft, and means controlled by the movement of said carriage to rotate said power shaft, substantially as described.

7. A wave motor apparatus comprising an inclined track, a carriage mounted to reciprocate on said track, a float carried by said carriage, a shutter frame and shutters carried by said carriage and mounted transversely thereon, and means for automatically closing said shutters as said carriage moves upward, and for opening said shutters as said carriage descends, comprising a pin rack mounted beneath the carriage, an operating rod connecting the several shutters, a crank arm connected to one of said shutters, a lever pivoted to said carriage and having an arm projecting into engagement with said pin rack, with a link connecting said crank arm and said lever, a power shaft, and means controlled by the movement of said carriage to rotate said power shaft, with means for independently hauling said carriage out of engagement with the waves, when desired, substantially as described.

8. A wave motor apparatus comprising an inclined track, a carriage mounted to reciprocate on said track, a cylindrical float journaled in bearings carried by said carriage, and having its axis at right angles to the direction of movement of said carriage, a shutter frame and shutters carried by said carriage and mounted transversely thereon, and means for automatically closing said shutters as said carriage moves upward, and for opening said shutters as said carriage descends, comprising a pin rack mounted beneath the carriage, an operating rod connecting the several shutters, a crank arm connected to one of said shutters, a lever pivoted to said carriage and having an arm projecting into engagement with said pin rack, with a link connecting said crank arm and said lever, a power shaft, and means controlled by the movement of said carriage to rotate said power shaft, with means for independently hauling said carriage out of engagement with the waves, when desired, substantially as described.

9. A wave motor apparatus comprising an inclined track, a carriage mounted to reciprocate on said track, a float carried by said carriage, a shutter frame and shutters carried by said carriage and mounted transversely thereon, and means for automatically closing said shutters as said carriage moves upward, and for automatically opening said shutters as the carriage descends, a power shaft, and means controlled by the movement of said carriage to rotate said power shaft, substantially as described.

10. A wave motor apparatus comprising an inclined track, a carriage mounted to reciprocate on said track, a cylindrical float journaled in bearings carried by said carriage, and having its axis at right angles to the direction of movement of said carriage, a shutter frame and shutters carried by said carriage and mounted transversely thereon, and means for automatically closing said shutters as said carriage moves upward, and for automatically opening said shutters as the carriage descends, a power shaft, and means controlled by the movement of said carriage to rotate said power shaft, substantially as described.

11. A wave motor apparatus comprising an inclined track, with guard rails parallel to said track, a carriage mounted to reciprocate on said track and provided with main wheels, and guard wheels engaging said guard rails and adapted to hold said carriage against vertical or lateral displacement, a cylindrical float journaled in bearings carried by said carriage, and having its axis at right angles to the direction of movement of said carriage, a shutter frame and shutters carried by said carriage and mounted transversely thereon, and means for automatically closing said shutters as said carriage moves upward, a power shaft, and means controlled by the movement of said carriage to rotate said power shaft, substantially as described.

CLAUDE M. JOHNSON.

Copies of this patent may be obtained for five cents each, by addressing the "Commissioner of Patents, Washington, D. C."